United States Patent
Devarakonda et al.

(10) Patent No.: US 10,324,758 B1
(45) Date of Patent: Jun. 18, 2019

(54) READ LOAD TASK THROTTLING

(71) Applicant: Workday, Inc., Pleasanton, CA (US)

(72) Inventors: Shivender Devarakonda, Pleasanton, CA (US); Lawrence Lam, San Mateo, CA (US)

(73) Assignee: Workday, Inc., Pleasanton, CA (US)

( * ) Notice: Subject to any disclaimer, the term of this patent is extended or adjusted under 35 U.S.C. 154(b) by 92 days.

(21) Appl. No.: 15/476,718

(22) Filed: Mar. 31, 2017

(51) Int. Cl.
*G06F 9/46* (2006.01)
*G06F 9/50* (2006.01)

(52) U.S. Cl.
CPC ................... *G06F 9/5011* (2013.01)

(58) Field of Classification Search
None
See application file for complete search history.

(56) References Cited

U.S. PATENT DOCUMENTS

| | | | | |
|---|---|---|---|---|
| 6,560,717 B1* | 5/2003 | Scott | ...... | G06F 9/505 714/4.1 |
| 8,407,440 B2* | 3/2013 | Le Moal | ...... | G06F 3/0625 711/100 |
| 9,235,645 B1* | 1/2016 | Khafizova | ...... | G06F 17/30867 |
| 2005/0256956 A1* | 11/2005 | Littlefield | ...... | G06Q 10/06 709/225 |
| 2008/0313024 A1* | 12/2008 | Kunichika | ...... | G06Q 10/06 705/7.15 |
| 2010/0174697 A1* | 7/2010 | Mor-Barak | ...... | G06F 17/30902 707/705 |

* cited by examiner

*Primary Examiner* — Gregory A Kessler
(74) *Attorney, Agent, or Firm* — Van Pelt, Yi & James LLP

(57) ABSTRACT

A system for throttling includes an interface and a processor. The interface is configured to receive a read task. The processor is configured to determine a read engine of a set of read engines for the read task, submit the read task to the read engine for execution, determine whether the read task execution time exceeds a resubmit threshold time, and in the event that the read task execution time exceeds the resubmit threshold time, resubmit the read task, wherein resubmitting the read task includes determining a new read engine for the read task.

19 Claims, 6 Drawing Sheets

Report ID: 513-589-902
Email: john.doe.5510@gmail.com
User: jdoe

| | |
|---|---|
| Total Yearly Income | 25,117,021 |
| Total Yearly Expenses | 22,004,683 |
| R&D Expenses | 4,342,640 |
| Marketing Expenses | Failed to Complete |
| Salaries | 8,313,954 |
| Benefits | Failed to Complete |
| Travel Expenses | 877,469 |
| Planning Retreat Expenses | 15,997 |
| Recruitment Expenses | Failed to Complete |

Resubmit All Failed Tasks

FIG. 7

READ LOAD TASK THROTTLING

BACKGROUND OF THE INVENTION

Large-scale databases accessible by multiple users and multiple tenants (e.g., distinct organizational entities) typically include a plurality of read servers for executing database read operations. Database read operations do not modify the database; therefore, multiple read operations can occur in parallel without a danger of corrupting data. When a database read operation is received by the database, a read server is selected by the database and the operation is provided to the read server. In the event read operations are provided to a read server more rapidly than the operations can be executed, the read server holds read operations in a queue of pending operations. Estimating the time to execute an operation is difficult (for example, the time to complete a read operation typically depends strongly on the quantity of data to read from the database, which may not be reflected in the instructions of the read operation), so determining the length of the queue associated with a given read server or the read server with the shortest queue can be difficult. A read operation can be put in a read server queue with a very time consuming operation in front of it and be stuck for an unnecessarily long period of time.

BRIEF DESCRIPTION OF THE DRAWINGS

Various embodiments of the invention are disclosed in the following detailed description and the accompanying drawings.

FIG. 7 is a diagram illustrating an embodiment of a report.

DETAILED DESCRIPTION

Figure 1:
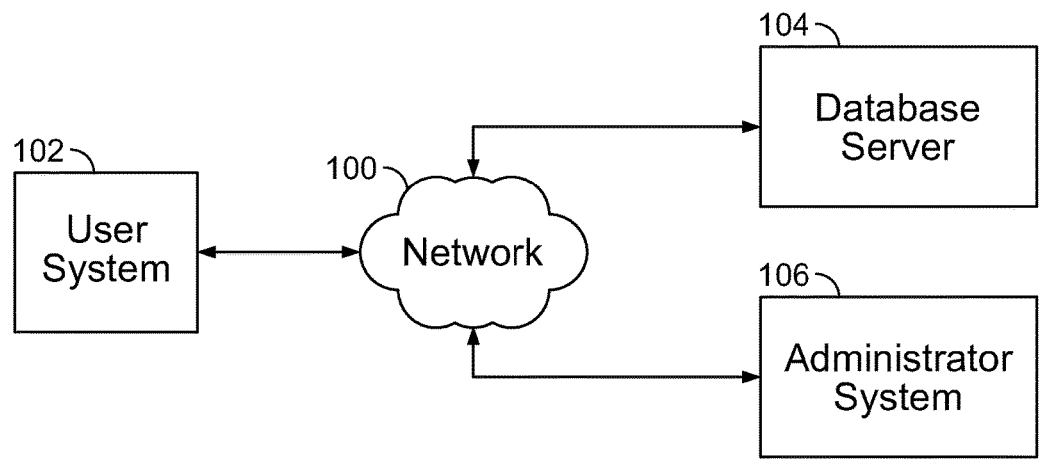
FIG. 1 is a block diagram illustrating an embodiment of a network system comprising a database server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for throttling is disclosed. The system comprises an interface and a processor. The interface is configured to receive a read task. The processor is configured to determine a read engine of a set of read engines for the read task, submit the read task to the read engine for execution, determine whether the read task execution time exceeds a resubmit threshold time, and in the event the read task execution time exceeds the resubmit threshold time, resubmit the read task, wherein resubmitting the read task includes determining a new read engine for the read task. In some embodiments, the system for throttling additionally comprises a memory coupled to the processor and configured to provide the processor with instructions.

In some embodiments, a large-scale database that is accessible by multiple users and multiple tenants (e.g., distinct organizational entities) includes a plurality of read servers for executing database read operations. Database read operations do not modify the database; therefore, multiple read operations can occur in parallel without a danger of corrupting data. When a database read operation is received by the database, a read server is selected by the database and the operation is provided to the read server. In the event read operations are provided to a read server more rapidly than the operations can be executed, the read server holds read operations in a queue of pending operations.

In some embodiments, the read server is referred to as an Object Read-Only Server or Object Report Server (ORS). The ORS is a service capable of processing read or reporting tasks for a tenant (e.g., an individual client company or entity that uses the service provided using the database). In some embodiments, a reporting task includes the generation of a report using data stored in the database and can include multiple reads (e.g., hundreds of reads, thousands of reads, millions of reads, billions of reads, trillions of reads, etc.) that can take a short amount of time to process or a long amount of time to process. The use of multiple ORS's allows for elastic horizontal scaling of read capacity for a system or a tenant and can be used to support the offloading of user interface processing, web service processing, and/or background job processing. In some embodiments, the ORS's are separate processing servers from servers able to write to the database and/or servers involved in processing transactions with the database.

In the description below, the system is described with respect to an ORS as a read server. However, it should be obvious to a person of skill in the art that the description is equally applicable to any read server with a read engine processing a read task of a database.

In some embodiments, a system for throttling comprises a database server including a transactional server and a plurality of ORS systems (e.g., read servers). When the database server receives a read transaction request, an ORS is determined for the read transaction (e.g., randomly, based at least in part on an ORS queue length, based at least in part on an average ORS loading, etc.). The transaction is provided to an ORS, and in the event the ORS has processing capacity, the transaction is executed. In the event the ORS does not have processing capacity, the transaction is added to a transaction queue for the ORS. A timer monitors the time associated with the transaction starting at a time that the transaction was provided to the ORS. In the event the monitored time exceeds a threshold time without the transaction beginning to be processed, the transaction is removed from that ORS queue and resubmitted, including determining a new ORS engine. In some embodiments, a second timer monitors the time associated with the transaction since the transaction was received by the database server (e.g., the total transaction processing time) and in the event the time measured by the second timer exceeds a global threshold, the transaction processing is cancelled and the transaction is indicated as timed out.

FIG. 1 is a block diagram illustrating an embodiment of a network system comprising a database server. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, database server 104, and administrator system 106 communicate via network 100. In some embodiments, user system 102 comprises a user system for use by a user. In various embodiments, user system 102 comprises a system for executing applications, processing data, displaying data, displaying images, displaying video, accessing database records, creating planning data, communicating with one or more server systems, or performing any other appropriate user system action. In various embodiments, database server 104 comprises a database server for storing database data, providing database data, operating on database data, or for any other appropriate purpose. In various embodiments, administrator system 106 comprises an administrator system for providing administrator commands to database server 104, for configuring software on database server 104, for providing database requests to database server 104, or for performing any other appropriate administrator system actions.

Figure 2:
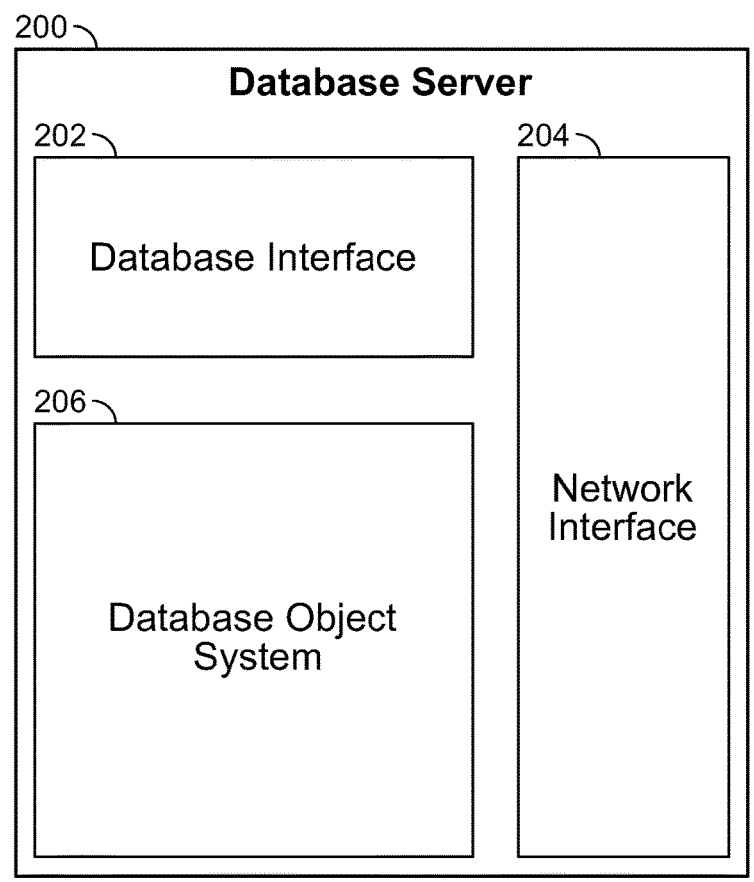
FIG. 2 is a block diagram illustrating an embodiment of a database server.

FIG. 2 is a block diagram illustrating an embodiment of a database server. In some embodiments, database server 200 comprises database server 104 of FIG. 1. In the example shown, database server 200 comprises database interface 202. In various embodiments, database interface 202 comprises a database interface for accessing database data (e.g., database data stored in database object system 206), for adding database data, for searching database data, or for interfacing with database data in any other appropriate way. In some embodiments, database interface 202 comprises a processor. Network interface 204 comprises an interface for communication via a network. In various embodiments, network interface 204 comprises a network interface for communicating with a user system, a spreadsheet system, the Internet, or any other appropriate system or network. In some embodiments, network interface 204 is implemented using a processor. Database object system 206 comprises a database object system for storing and retrieving database data. In various embodiments, database data comprises finance data, human resources data, resource allocation data, planning data or any other appropriate data. In some embodiments, database object system 206 comprises a database stored as a plurality of objects. In some embodiments, database object system 206 includes modules for managing functionality associated with the processing for data stored in the database (e.g., modules for providing transactions to an object transaction system or an object read system, receiving data from an object transaction system or an object read system and providing the data to a user, etc.; modules for one or more object transaction systems for executing object transactions (e.g., reading and/or writing data); and/or modules for one or more object read systems for executing object read operations (e.g., reading object database data)). In some embodiments, database object system 206 is implemented using a processor. In some embodiments, database object system 206 comprises a system including multiple computing server systems. In various embodiments, the elements of database server 200 are implemented each on a separate processor, all on a single processor, or combined onto a plurality of processors in any other appropriate way. In some embodiments, database server 200 additionally comprises a data storage.

Figure 3:
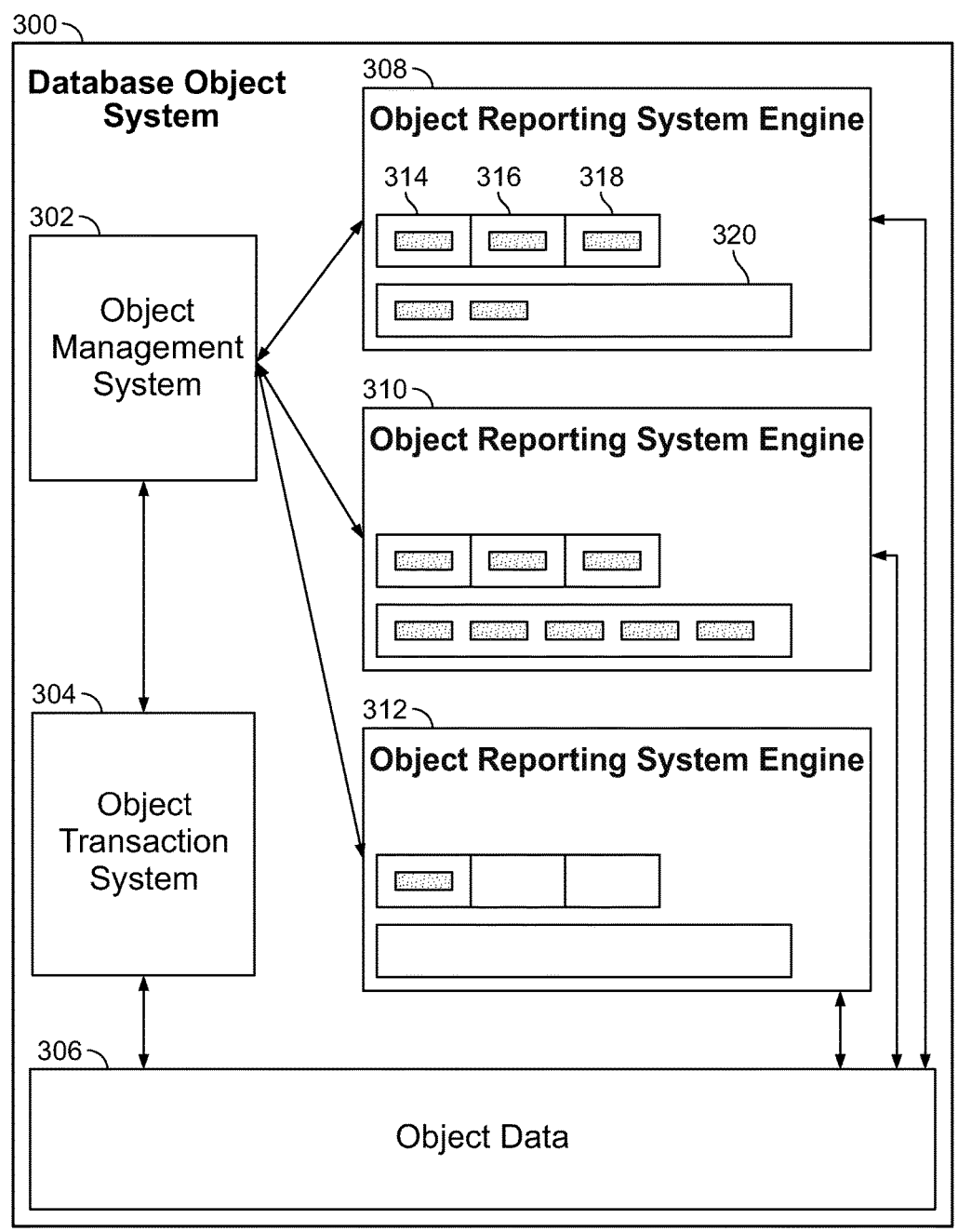
FIG. 3 is a block diagram illustrating an embodiment of a database object system.

FIG. 3 is a block diagram illustrating an embodiment of a database object system. In some embodiments, database object system 300 of FIG. 3 comprises database object system 206 of FIG. 2. In the example shown, database object system 300 of FIG. 3 comprises object management system (e.g., OMS) 302, object transaction system (e.g., OTS) 304, object data 306, object reporting system engine (e.g., ORS engine) 308, object reporting system engine 310, and object reporting system engine 312. In various embodiments, database object system 300 comprises 2, 3, 5, 9, 22, or any other appropriate number of object reporting systems. Object management system 302 receives database requests (e.g., from a user system, from an administrator system, etc.—for example, database requests to retrieve data, to modify data, to process data, etc.). When object management system 302 receives a database request to modify data (e.g., to write new data, to process data, to perform a transformation that may require modifying data, etc.), it passes the request to object transaction system 304. Object transaction system reads data from object data 306, writes data to object data 306, processes data, etc. In some embodiments, object transaction system 304 places a lock on object data 306 to prevent other changes from occurring while it is processing a change. Object data 306 comprises a set of data stored as a plurality of objects. In some embodiments, objects comprise encapsulated data storage entities comprising data and relations to other objects. In some embodiments, a history of modifications to object data 306 is stored in a transactional object stack, wherein transaction objects of the transactional object stack represent modifications to object data 306.

In some embodiments, when object management system 302 receives a database request to read data or perform computations for reporting, it passes the database request to an object reporting system engine (e.g., object reporting system engine 308, object reporting system engine 310, or object reporting system engine 312). In various embodiments, object management system 302 chooses the object reporting system engine randomly, based at least in part on loading information for an object reporting system engine, or any other appropriate way. Each object reporting system engine comprises one or more worker threads (e.g., worker thread 314, worker thread 316, and worker thread 318 of object reporting system 308) for processing reporting or read jobs. In the example shown, the three worker threads of object reporting system engine 308 are each processing jobs (e.g., represented in FIG. 3 by solid black rectangles). Each object reporting system engine additionally comprises a queue (e.g., queue 320 of object reporting system engine 308). In the example shown, queue 320 holds two read jobs to be processed. When a read job is provided to an object reporting system engine, the object reporting system engine determines whether any of its worker threads are available (e.g., not currently processing a job). In the event a worker thread is available, it begins processing the job. In the event a worker thread is not available, the object reporting system engine puts the job in its queue. After a worker thread completes a job and returns its results to the object management system, a job is taken from the queue and processed by the now-available worker thread. A job processing time depends on the quantity of data required to be read from object data 306 and is not necessarily apparent from the job instructions. The processing time of a job can vary widely (e.g., from milliseconds to hours or days), making it difficult to estimate the amount of time required to complete jobs in a queue. It is possible that an object reporting system will become clogged with long-running read jobs and leave other jobs stuck in the queue and prevented from executing. To address this problem, when a job for reading is received a global timer is started.

Figure 4:
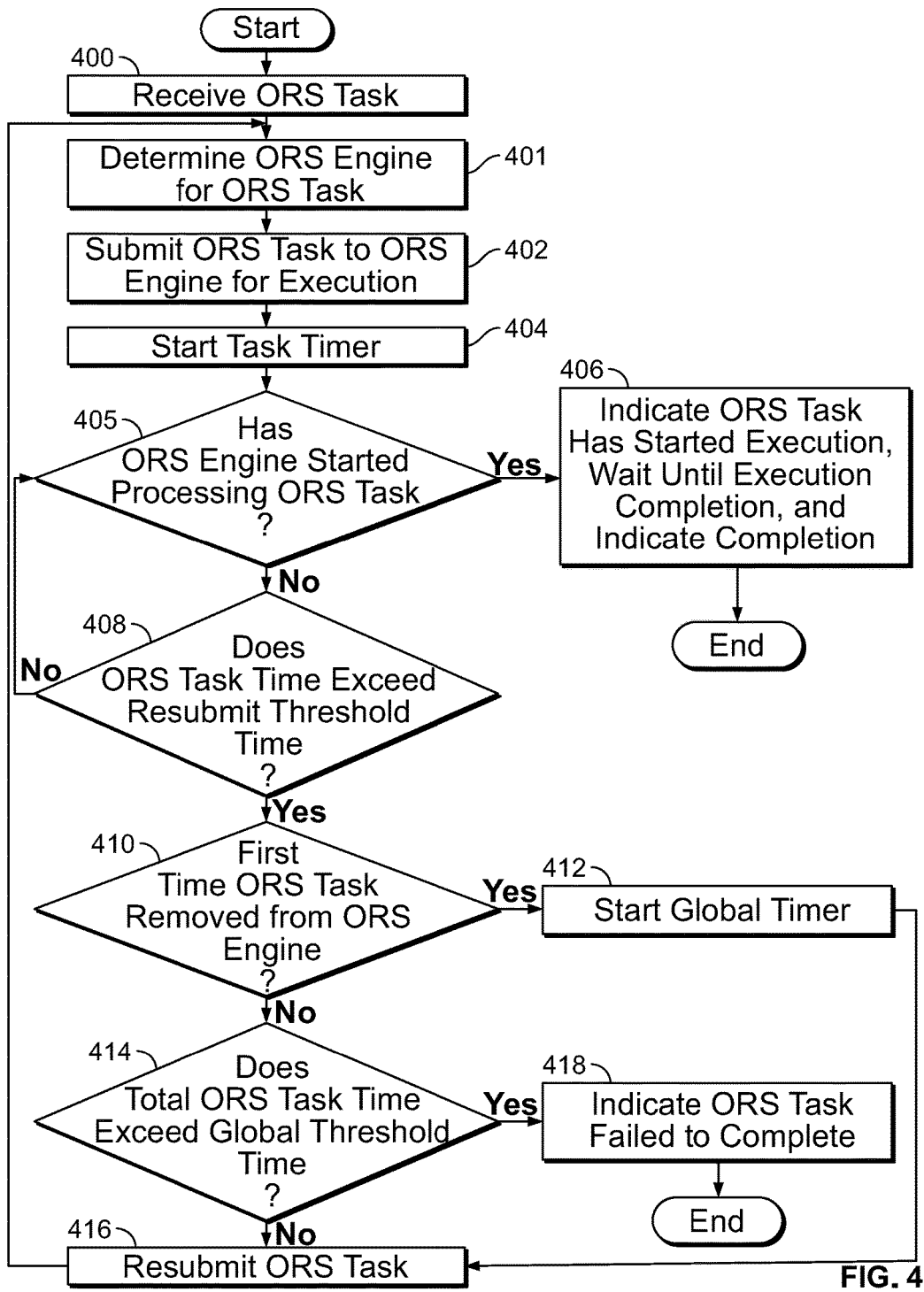
FIG. 4 is a flow diagram illustrating an embodiment of a process for executing an ORS task.

FIG. 4 is a flow diagram illustrating an embodiment of a process for executing an ORS task. In some embodiments, the process of FIG. 4 comprises a process for throttling. In some embodiments, the process of FIG. 4 is executed by database server 104 of FIG. 1. In some embodiments, the process of FIG. 4 is executed by object management system 302 of FIG. 3. In the example shown, in 400, an ORS task is received (e.g., from a user system, an administrator system, etc.). In 401, an ORS engine is determined for the ORS task. For example, it is determined which ORS engine is to be used to perform the ORS task (e.g., randomly, based on loading, based on inverse loading, based on a pattern, etc.). In 402, the ORS task is submitted to the ORS engine for execution. In 404, a task timer is started. For example, a timer is started for this task (e.g., the timer is started each time the task is submitted or resubmitted) to measure the execution time for the task. In 405, it is determined whether the ORS engine has started processing the ORS task. For example, progress on the ORS task processing is monitored to determine whether the ORS task has started execution successfully by the ORS engine (e.g., started producing output, provided an indication of successful processing, terminated processing, etc.). In the event it is determined that the ORS engine has started processing the ORS task, control passes to 406. In 406, it is indicated that the ORS task has started execution, waits until execution completion, indicates completion, and the process ends. In the event it is determined that the ORS engine has not started processing the ORS task, control passes to 408. In 408, it is determined whether the ORS task time exceeded a resubmit threshold time. For example, it is determined whether the ORS task time exceeded a resubmit threshold time without starting the ORS task processing. In various embodiments, the resubmit threshold time comprises 1 minute, 2 minutes, 5 minutes, 10 minutes, or any other appropriate resubmit threshold time. In some embodiments, determining whether the ORS task execution time exceeded a resubmit threshold time comprises determining whether the ORS engine returned a timeout error code (e.g., whether the ORS engine indicated that the ORS task execution time exceeded a resubmit threshold time). In various embodiments, in the event the ORS task execution time did not exceed a resubmit threshold time, the ORS task did not start processing successfully because the process failed, because a database error occurred, because the process was killed by a systems administrator, or for any other appropriate reason.

In the event that the ORS task time does not exceed the resubmit threshold time, control passes to 405. For example, during processing and before the resubmission threshold time, the process is checked to see if the process has started execution. In some embodiments, there is a wait time between 408 and 405 (e.g., a 30 ms wait, a 300 ms wait, a 3 second wait, an approximate time for processing wait, a 10% of approximate time to wait, or any other appropriate wait). In the event that the ORS task time does exceed the resubmit threshold time, then in 410 it is determined whether it is the first time the ORS task has been removed from the ORS engine. In the event that it is the first time the ORS task has been removed from the ORS engine, control passes to 412. In 412, a global timer is started. For example, a timer is started to track the time used in processing the task after the first attempt, and control passes to 416. In the event that it is not the first time the ORS task has been removed from the ORS engine, then in 414 it is determined whether the total ORS task time exceeds the global threshold time. In various embodiments, the global threshold time comprises 15 minutes, 500% of estimated time to complete, x multiple of average time to complete, y percentile of time to complete, or any other appropriate time. In some embodiments, the total ORS task execution time (e.g., the total time since the ORS task was received, for example, in 400) is monitored. In the event that the total task time does exceed the global threshold time, then in 418 it is indicated that the ORS task failed to complete and the process ends. In the event that the total task time does not exceed the global threshold time, then control passes to 416. In 416, the ORS task is resubmitted and control passes to 401. In some embodiments, resubmitting the ORS task comprises determining a new ORS engine for the ORS task.

Figure 5:
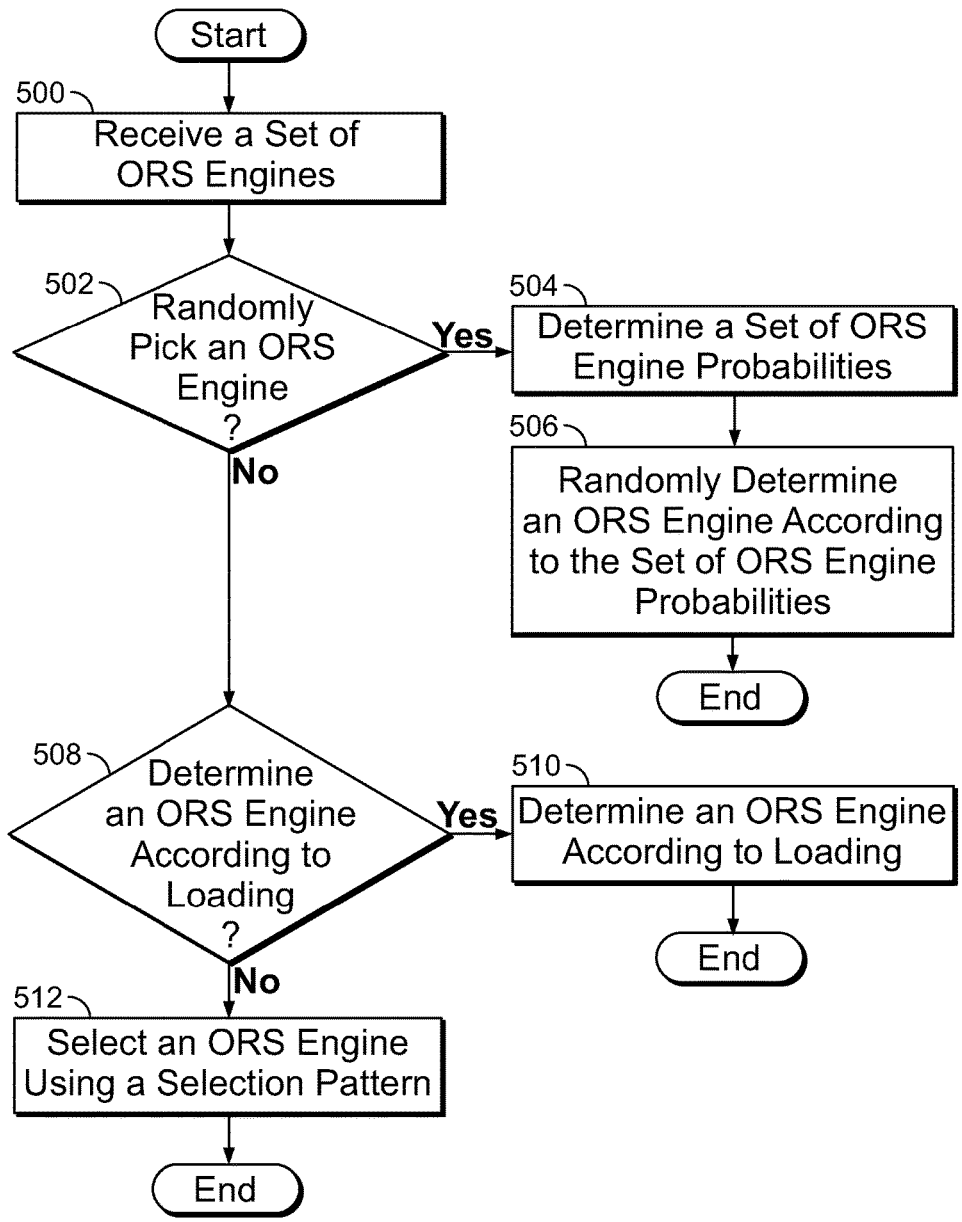
FIG. 5 is a flow diagram illustrating an embodiment of a process for determining an ORS engine of a set of ORS engines.

FIG. 5 is a flow diagram illustrating an embodiment of a process for determining an ORS engine of a set of ORS engines. In some embodiments, the process of FIG. 5 implements 401 of FIG. 4. In the example shown, in 500, a set of ORS engines is received. In some embodiments, the set of ORS engines comprises the set of all ORS engines associated with a database server (e.g., database server 104 of FIG. 1). In 502, it is determined whether to determine an ORS engine by randomly picking an ORS engine. In the event it is determined to determine an ORS engine by randomly picking an ORS engine, control passes to 504. In 504, a set of ORS engine probabilities is determined. In various embodiments, the set of ORS engine probabilities is determined to be a set with equal probability for each ORS engine, a set with probability for an ORS engine determined to be inversely proportional to the loading of the ORS engine, a set with probability for an ORS engine based at least in part on a typical loading for the ORS engine, or a set with probabilities determined in any other appropriate way. In 506, an ORS engine is randomly determined according to the set of ORS engine probabilities. The process then ends. In the event it is determined in 502 not to determine an ORS engine by randomly picking an ORS engine, control passes to 508. In 508, it is determined whether to determine an ORS engine according to loading. In the event it is determined to determine an ORS engine according to loading, control passes to 510. In 510, an ORS engine is determined according to loading. In various embodiments, determining an ORS engine according to loading comprises determining an ORS engine with an available thread, determining an ORS engine with the fewest jobs in its queue, determining an ORS engine with a queue estimated to be completed in the shortest period of time, determining an ORS engine that is loaded less than a threshold, or determining an ORS engine according to loading in any other appropriate way. In some embodiments, determining an ORS engine according to loading comprises not determining an ORS engine that is indicated to be blocked. The process then ends. In the event it is determined in 508 not to determine an ORS engine according to loading, control passes to 512. In 512, an ORS engine is selected using a selection pattern. In some embodiments, selecting an ORS engine using a selection pattern comprises determining a selection pattern (e.g., an ordered list of ORS engines) and selecting the next ORS engine of the selection pattern (e.g., the ORS engine after the ORS engine selected the last time the process of FIG. 5 was executed). In some embodiments, the first ORS engine of the selection pattern is selected. In some embodiments, in 512, an ORS engine is selected in any other appropriate way.

Figure 6:
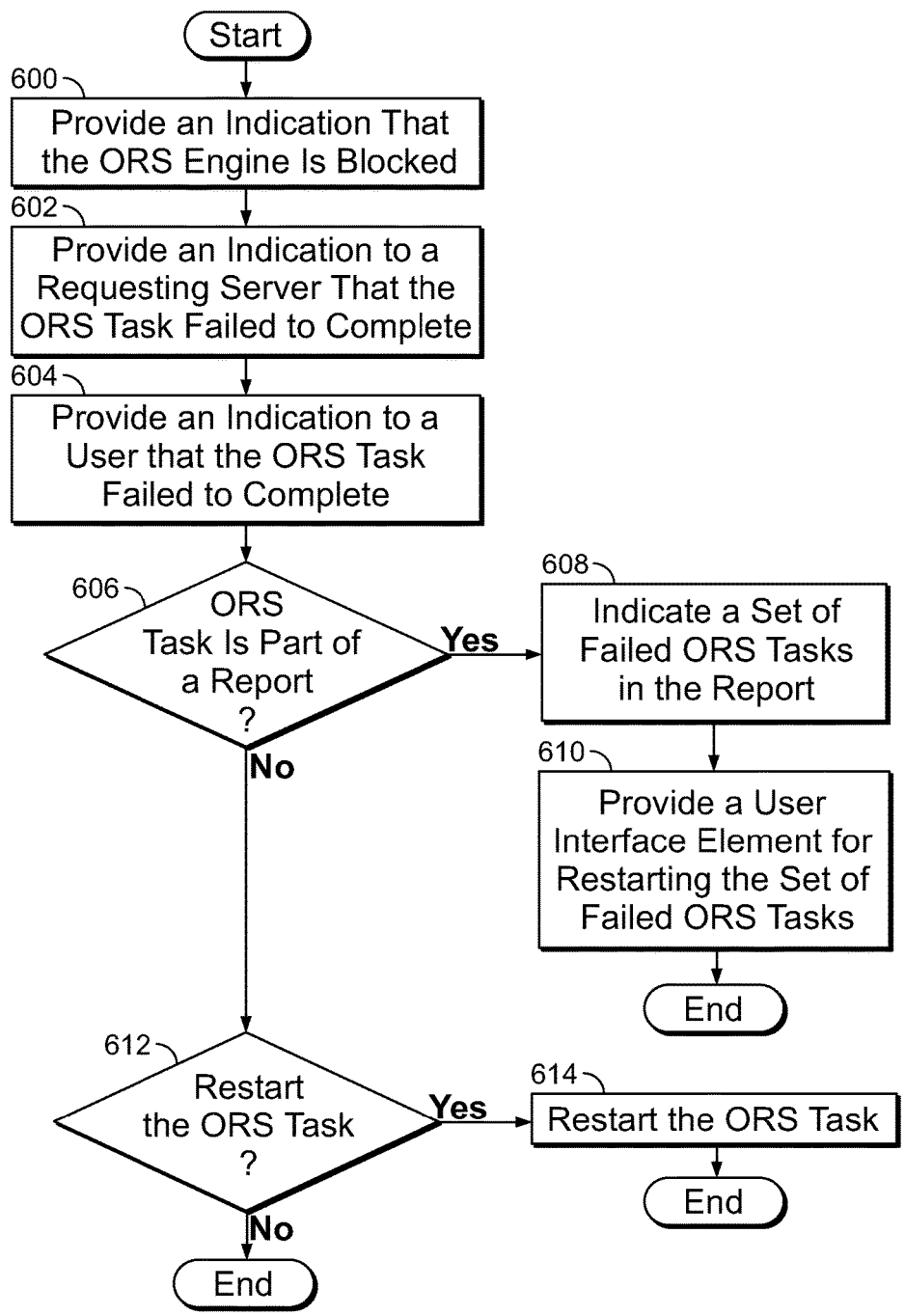
FIG. 6 is a flow diagram illustrating an embodiment of a process for indicating an ORS task failed to complete.

FIG. 6 is a flow diagram illustrating an embodiment of a process for indicating an ORS task failed to complete. In some embodiments, the process of FIG. 6 implements 418 of FIG. 4. In the example shown, in 600, an indication is provided that the ORS engine is blocked. In some embodiments, an indication that the ORS engine is blocked comprises an indication that the ORS engine is busy executing an ORS task that takes enough time such that it is causing other ORS tasks to exceed the resubmit threshold time (e.g., and therefore other ORS tasks should not be assigned to the ORS engine until the ORS engine becomes unblocked). In some embodiments, in the event an ORS engine previously indicated as blocked is determined to have an empty task queue, the ORS engine is indicated as not blocked. In 602, an indication is provided to a requesting server that the ORS task failed to complete. In 604, an indication is provided to a user that the ORS task failed to complete. In 606, it is determined whether the ORS task is part of a report (e.g., a report comprising a plurality of ORS tasks). In the event it is determined that the ORS task is part of a report, control passes to 608. In 608, a set of failed tasks (e.g., the ORS task that failed to complete and any other ORS tasks of the report that failed to complete) is indicated in the report. In 610, a user interface element is provided for restarting the set of failed ORS tasks (e.g., a "restart failed tasks" button is provided as part of the report). The process then ends. In the event it is determined in 606 that the ORS task is not part of a report, control passes to 612. In 612, it is determined whether to restart the ORS task (e.g., automatically, without user input). In the event it is determined to restart the ORS task, control passes to 614. In 614, the ORS task is restarted (e.g., using the process of FIG. 4). In the event it is determined in 612 not to restart the ORS task, the process ends.

FIG. 7 is a diagram illustrating an embodiment of a report. In some embodiments, the report of FIG. 7 is produced by executing a set of ORS tasks Report 700 comprises a set of business financial data total numbers (e.g., total yearly income, total yearly expenses, R&D expenses, etc.). Each number is determined by reading and summing a set of numbers from a database. In the example shown, three of the business financial data total numbers are missing because the associated object read system task failed to complete (e.g., as a result of the throttling process of FIG. 4). Each missing total number is indicated with a Failed To Complete box (e.g., Failed To Complete box 702). In some embodiments, a Failed To Complete box comprises a user interface element for indicating to restart a failed job. FIG. 7 additionally comprises Resubmit All Failed Tasks box 704, comprising a user interface element for indicating to resubmit all tasks that failed to complete.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for throttling, comprising:
an interface configured to receive a read task; and
a processor configured to:
  determine a read engine of a set of read engines for the read task;
  submit the read task to the read engine for execution;
  determine whether a read task execution time exceeds a resubmit threshold time;
  in response to the read task execution time exceeding the resubmit threshold time, determine whether a total read task execution time exceeds a global threshold time; and
  in response to it being determined that the total read task execution time does not exceed the global threshold time, resubmit the read task, wherein resubmitting the read task includes determining a new read engine for the read task.

2. The system of claim 1, wherein the processor is further configured to determine that the read engine had not started processing the read task prior to determining whether the read task execution time exceeds the resubmit threshold time.

3. The system of claim 1, wherein the resubmit threshold time comprises 1 minute, 2 minutes, 5 minutes, or 10 minutes.

4. The system of claim 1, wherein the processor is further configured to monitor a total read task execution time.

5. The system of claim 1, wherein the processor is further configured to:
in response to it being determined that the total read task execution time exceeds the global threshold time, indicate that the read task failed to complete.

6. The system of claim 5, wherein indicating that the read task failed to complete comprises indicating to a user that the read task failed to complete.

7. The system of claim 5, wherein indicating that the read task failed to complete comprises restarting the read task.

8. The system of claim 5, wherein indicating that the read task failed to complete comprises indicating a set of one or more failed read tasks in a report.

9. The system of claim 5, wherein indicating that the read task failed to complete comprises providing a user interface element for restarting a set of one or more failed read tasks.

10. The system of claim 1, wherein determining the new read engine for the read task comprises randomly picking the new read engine.

11. The system of claim 10, wherein randomly picking the new read engine comprises randomly picking the new read engine with equal probability for each read engine of the set of read engines.

12. The system of claim 10, wherein randomly picking the new read engine comprises randomly picking the new read engine with probability for the read engine of the set of read engines inversely proportional to a loading of the read engine.

13. The system of claim 1, wherein determining the new read engine for the read task comprises determining the read engine that is loaded less than a threshold.

14. The system of claim 1, wherein the processor is further configured to:
in the event that the task execution time exceeds the resubmit threshold time, indicate that the read engine is blocked.

15. The system of claim 14, wherein the processor is further configured to indicate the read engine as not blocked in the event that the read engine previously indicated as blocked is determined to have an empty task queue.

16. The system of claim 1, wherein the read task comprises part of a report.

17. The system of claim 1, wherein determining whether the read task execution time exceeded a resubmit threshold time comprises determining whether the read engine returned a timeout error code.

18. A method for throttling, comprising:
receiving a read task;
determining, using a processor, a read engine of a set of read engines for the read task;
submitting the read task to the read engine for execution;
determining whether a read task execution time exceeds a resubmit threshold time;
in response to the read task execution time exceeding the resubmit threshold time, determining whether a total read task execution time exceeds a global threshold time; and
in response to it being determined that the total read task execution time does not exceed the global threshold time, resubmitting the read task, wherein resubmitting the read task includes determining a new read engine for the read task.

19. A computer program product for throttling, the computer program product being embodied in a non-transitory computer-readable storage medium and comprising computer instructions for:
receiving a read task;
determining, using a processor, a read engine of a set of read engines for the read task;
submitting the read task to the read engine for execution;
determining whether a read task execution time exceeds a resubmit threshold time;
in response to the read task execution time exceeding the resubmit threshold time, determining whether a total read task execution time exceeds a global threshold time; and
in response to it being determined that the total read task execution time does not exceed the global threshold time, resubmitting the read task, wherein resubmitting the read task includes determining a new read engine for the read task.

* * * * *